June 14, 1927.

C. C. CARPENTER

BATTERY CELL

Filed Oct. 23. 1920

INVENTOR.
Campbell C. Carpenter.
BY Raymond H. Van Kest
ATTORNEYS.

June 14, 1927.

C. C. CARPENTER 1,632,364

BATTERY CELL

Filed Oct. 23, 1920

INVENTOR.
Campbell C. Carpenter.
BY
ATTORNEYS.

Patented June 14, 1927.

1,632,364

UNITED STATES PATENT OFFICE.

CAMPBELL C. CARPENTER, OF NIAGARA FALLS, NEW YORK, ASSIGNOR TO U. S. LIGHT & HEAT CORPORATION, OF NIAGARA FALLS, NEW YORK, A CORPORATION OF NEW YORK.

BATTERY CELL.

Application filed October 23, 1920. Serial No. 418,938.

The present invention relates to battery cells.

In battery cells of large size, as for instance, those used in marine service, it is necessary to provide special means for ventilating the cells to remove the gases which are formed by the action of the electrolyte.

The present invention has for one of its objects the provision of means whereby the cell may be ventilated efficiently and whereby a minimum of reduction in the amount of electrolyte will occur through evaporation and through entrainment with the exhaust gases.

A further object is to provide a novel construction in which the air which is introduced into the cell to replace the exhaust gases will cool those parts of the cell which tend to become overheated.

A further object is to provide a cell which will have a minimum of resistance in the conducting parts of the elements, in which ventilation and cooling are provided for and in which corrosion of the metal parts is minimized.

Further objects will be apparent as the description proceeds.

Figure 1:
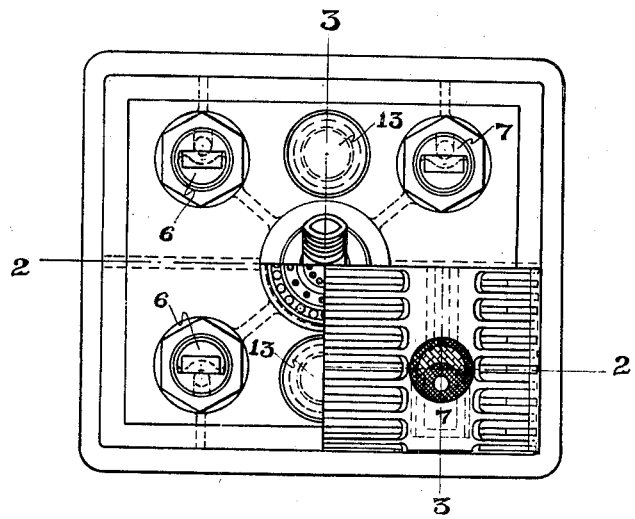
Figure 1 is a plan view, partly in section, showing one embodiment of the present invention.
Figure 2:
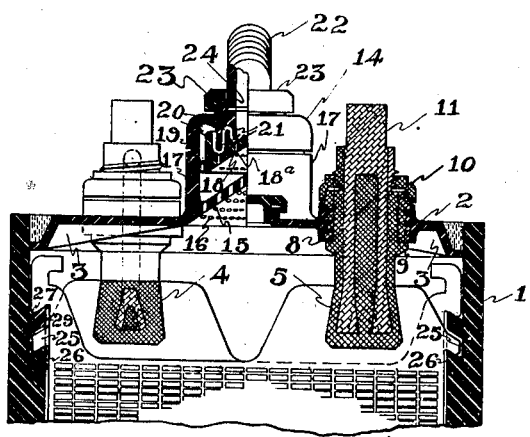
Figure 2 is a sectional elevation taken along the line 2, 2 of Fig. 1.
Figure 3:
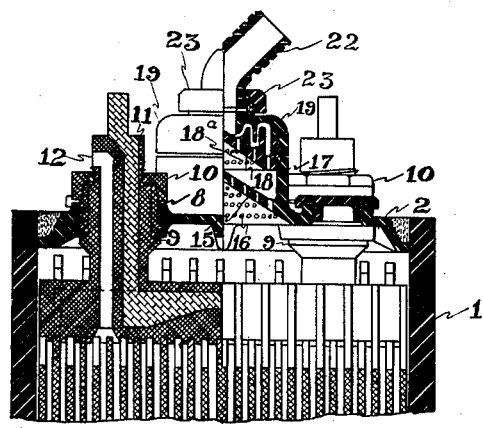
Figure 3 is a view in sectional elevation taken along the line 3, 3 of Fig. 1.

The jar of the battery cell is indicated by the numeral 1. This jar has a cover 2 tightly sealed thereto by means of sealing compound or by any other preferred means. The cover 2 may be provided with strengthening ribs 3, if desired. The jar 1 is adapted to contain the positive and negative groups of active elements. The plates of one group will be electrically and mechanically connected to a bus bar 4, while the plates of a group of opposite polarity will be connected to a bus bar 5. The bus bar 4 is illustrated as being provided with a pair of cell posts 6, 6, while the bus bar 5 is illustrated as being provided with a pair of cell posts 7, 7.

Each of the cell posts extends through the cover 2 and may be sealed to said cover in the following manner. The cover 2 is provided with four apertures to correspond to the four cell posts. Moulded within each aperture, or otherwise intimately secured to said cover is a bushing 8, preferably of lead. The cell post is provided with an annular collar 9 adapted to abut against the bushing 8 on the lower end of same. The upper part of the cell post is screw-threaded to receive a nut 10, which may be of lead or other acid-resisting material.

The bushing 8 and the nut 10 are provided with complementary tapered portions whereby, as said nut is turned down on the screw-threaded portion of the cell post, intimate contact will be secured between the bushing and said nut. A cell post construction is thereby provided in which creeping of the electrolyte along the cell post from within the jar is effectually prevented.

Each pair of cell posts with its corresponding bus bar is provided with a low resistance leading-in conductor 11, which may be of copper or other preferred material. This low resistance conductor 11 will reduce the resistance of the bus bars and the cell posts to a minimum. The leading-in conductor will be completely moulded within the bus bar and cell posts whereby there will be no possibility of corrosion.

Each of the cell posts is provided with a longitudinal hole 12 which extends through the bus bar to a point below the level of the electrolyte. The hole 12 should preferably be open to the atmosphere at a point in the cell post placed in the side of said cell post whereby to reduce to a minimum the danger of foreign matter dropping into said cell through the hole 12. Any preferred means may be provided for straining the air which enters the hole 12 to prevent the entrance of foreign matter. In practice, the acid level will be above the bus bars 4 and 5 whereby the lower opening of the hole 12 will always be below the level of the electrolyte. The invention is not limited, however, to any relative positions of the lower end of hole 12 and the level of the electrolyte. If preferred, the lower end of said hole 12 may be located above the level of the electrolyte.

The cover 2 is provided with a pair of apertures 13, 13, for filling and inspection. Placed preferably centrally of the cover is an exhaust mechanism 14 which will now be described. The central portion of the cover is provided with a cone-shaped portion 15, with its apex upward. Said cone-shaped portion 15 is provided with a plurality of apertures 16. Surrounding said cone-shaped portion 15 is an annular collar 17. A second cone-shaped portion 18 is adapted to have screw-threaded engagement with said collar 17. Mounted above the cone-shaped portion 18 is a cover 19 which may have screw-threaded engagement with said portion 18. The portion 18 is provided with annularly placed baffles 20, while the cover 19 is provided with annularly placed baffles 21. When the cover 19 is placed upon the cone-shaped portion 18 and the collar 17, the baffles 21 will be arranged adjacent to and intermediate of the baffles 20, whereby to provide a tortuous passage-way. The cone-shaped portion 18 is provided with apertures 18$^a$ placed between the baffles 20 and immediately beneath the baffles 21 of the cover 19.

By this construction, any drops of electrolyte collecting upon the bottom part of the baffles 21 will drop off through the aperture 18$^a$. A nozzle 22 is provided which may be secured to the cover 19 by means of a nut 23. The nozzle 22 may be provided with a flanged portion 24 adapted to fit the upper portion of the cover 19. The nut 23 will engage said flanged portion to hold the nozzle 22 in engagement with the cover 19. It will be evident that by merely loosening the nut 23, the nozzle 22 will be turned at any angle desired in a plane parallel to the cover 2.

Each of the plates adjacent the side connected to its bus bar is provided with a laterally extending lug 25 adapted to rest upon a shoulder 26 in the side wall of the jar. The opposite side of each of the plates is provided with a shoulder 27 which is adapted to rest upon a cross-bar 29. Each cross-bar 29 will be located between the lug 27 of the plates of one polarity and the lug 25 of the plates of opposite polarity. The plates will therefore be securely supported from the sides of the jar, short-circuiting from plate to plate will be minimized and the cross-bars 29 will have the further function that when the groups are removed from the jar, said cross-bars 29 will co-operate with the lugs 25 and 27 to prevent the separation of the elements. Handling is thus very greatly facilitated.

The construction of the plates involving the lugs 25 and 27 and the cross-bars 29 is not claimed herein but is illustrated for the purpose of disclosing a preferred construction. Said construction is claimed in an application of Burr H. Caldwell, filed September 24, 1917, Serial No. 192,880.

In operation the nozzle 22 will be connected to some exhaust means whereby the gases within the cell may be drawn off. Air to replace the exhaust air will enter the cell through holes 12 in the cell posts. Inasmuch as the lower openings of the holes 12 are below the level of the electrolyte, the incoming air must bubble through the electrolyte. The exhaust gases from the cell will pass through apertures 16 in the cone-shaped portion 15 of the cover and must necessarily pass through the aperture in the cone-shaped portion 18. A certain amount of electrolyte may be entrained in the gases which are drawn off and a certain amount may bubble up from the normal level of the electrolyte. The apertured portion 16 will strain out a considerable portion of this electrolyte. Of the electrolyte which passes the portion 16, a certain part may reach the lower apertures 18$^a$ in the portion 18. This part, before it can possibly reach the nozzle 22, must pass through the tortuous passage-way provided by the baffles 20 and 21. Electrolyte collecting on said baffles will drop through the apertures 18$^a$ back into the cell. In order to get out of the cell, the electrolyte must pass through the apertured portion 16 and the apertured portion 18. Therefore, only a very small quantity will be lost through the nozzle 22.

The air entering through the cell posts will cool said cell posts and will evaporate any electrolyte which may tend to creep through the holes 12. Inasmuch as the low resistance leading-in conductors 11 are completely embedded in the acid-resisting material of the bus bars and cell posts, and inasmuch as the hole 12 is removed from said low resistance leading-in conductors by a considerable thickness of acid-resisting material, the low resistance leading-in conductors 11 will be well protected from corrosion.

One embodiment of the present invention has been described in detail. Many modifications will occur to those skilled in the art. It is intended in this patent to cover all such modifications that come within the scope of the invention as defined by the appended claims.

What I claim as new and desire to secure by Letters Patent of the United States, is—

1. In combination, a cell post having a hole extending longitudinally therethrough, said post comprising a member of acid-resisting material having a leading-in conductor embedded therein, said conductor being spaced from said hole by the acid-resisting material.

2. In combination, a cell post having a hole extending longitudinally therethrough and opening laterally thereof, said post comprising a member of acid-resisting material having a leading-in conductor embedded therein, said conductor being spaced from said hole by the acid-resisting material.

In witness whereof, I have hereunto subscribed my name.

CAMPBELL C. CARPENTER.